(12) United States Patent
Shim et al.

(10) Patent No.: US 12,460,035 B2
(45) Date of Patent: Nov. 4, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Hyungseop Shim, Daejeon (KR); Seokgoo Jang, Daejeon (KR); Ki Young Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 881 days.

(21) Appl. No.: 17/640,282

(22) PCT Filed: Jul. 19, 2021

(86) PCT No.: PCT/KR2021/009254
§ 371 (c)(1),
(2) Date: Mar. 3, 2022

(87) PCT Pub. No.: WO2022/080631
PCT Pub. Date: Apr. 21, 2022

(65) Prior Publication Data
US 2022/0411557 A1    Dec. 29, 2022

(30) Foreign Application Priority Data

Oct. 16, 2020 (KR) .................. 10-2020-0134309
Jul. 15, 2021 (KR) .................. 10-2021-0093001

(51) Int. Cl.
| | |
|---|---|
| *C08F 279/02* | (2006.01) |
| *C08F 212/08* | (2006.01) |
| *C08F 220/14* | (2006.01) |
| *C08F 220/44* | (2006.01) |
| *C08F 293/00* | (2006.01) |
| *C08G 65/26* | (2006.01) |
| *C08G 69/00* | (2006.01) |
| *C08K 5/00* | (2006.01) |
| *C08K 5/098* | (2006.01) |

(52) U.S. Cl.
CPC .......... *C08F 279/02* (2013.01); *C08F 212/08* (2013.01); *C08F 220/14* (2013.01); *C08F 220/44* (2013.01); *C08F 293/00* (2013.01); *C08G 65/2612* (2013.01); *C08G 69/00* (2013.01); *C08K 5/0041* (2013.01); *C08K 5/098* (2013.01)

(58) Field of Classification Search
CPC .... C08F 212/08; C08F 220/14; C08F 220/44; C08F 279/02; C08F 293/00; C08G 69/00; C08G 65/2612; C08G 69/40; C08K 5/0041; C08K 5/09; C08K 5/098; C08L 33/12; C08L 51/04; C08L 71/02; C08L 77/12
See application file for complete search history.

(56) References Cited

U.S. PATENT DOCUMENTS

| | | | |
|---|---|---|---|
| 4,767,833 | A | 8/1988 | Yumoto et al. |
| 5,654,356 | A | 8/1997 | Namiki et al. |
| 5,891,962 | A | 4/1999 | Otsuzuki et al. |
| 2010/0160505 | A1 | 6/2010 | Kumazawa et al. |
| 2013/0281603 | A1 | 10/2013 | Jin et al. |
| 2014/0039104 | A1 | 2/2014 | Yang et al. |
| 2017/0198132 | A1 | 7/2017 | Choi et al. |

FOREIGN PATENT DOCUMENTS

| | | |
|---|---|---|
| CN | 101838425 A | 9/2010 |
| CN | 103476861 A | 12/2013 |
| CN | 105658725 A | 6/2016 |
| EP | 0703252 A2 | 3/1996 |
| JP | H08199008 A | 8/1996 |
| JP | H11147020 A | 6/1999 |
| JP | 2006-273877 A | 10/2006 |
| JP | 6513457 B2 | 5/2019 |
| JP | 2019210303 A | 12/2019 |
| KR | 10-0376052 B1 | 3/2003 |
| KR | 10-0423873 B1 | 3/2004 |
| KR | 10-20120078583 A | 7/2012 |
| KR | 10-20130018118 A | 2/2013 |
| KR | 10-20150033843 A | 4/2015 |
| KR | 10-20160075415 A | 6/2016 |
| KR | 10-20170103726 A | 9/2017 |
| KR | 10-1902060 B1 | 9/2018 |
| KR | 10-2019-0064989 A | 6/2019 |

OTHER PUBLICATIONS

International Search Report and Written Opinion issued in corresponding International Patent Application No. PCT/KR2021/009254, dated Jul. 19, 2021.
First Office Action issued in corresponding Chinese Patent Application No. 202180005384.4., dated Feb. 6, 2023.

*Primary Examiner* — Ana L. Woodward
(74) *Attorney, Agent, or Firm* — Morgan, Lewis & Bockius LLP

(57) ABSTRACT

Disclosed is a thermoplastic resin composition, a method of preparing the same, and a molded article including the same. Also disclosed is a thermoplastic resin composition including 100 parts by weight of a base resin consisting of a graft copolymer and a non-graft copolymer, 6 to 15 parts by weight of a polyether-amide block copolymer, 0.2 to 0.9 parts by weight of a metal stearate, and 0.001 to 0.006 parts by weight of an organic pigment; a method of preparing the thermoplastic resin composition; and a molded article including the thermoplastic resin composition.

Also disclosed is a thermoplastic resin composition having excellent transparency, colorability, color stability, chemical resistance, and antistatic properties, thus being suitable for use in the manufacture of medical products; a method of preparing the thermoplastic resin composition; and a molded article including the thermoplastic resin composition.

14 Claims, No Drawings

THERMOPLASTIC RESIN COMPOSITION, METHOD OF PREPARING THE SAME, AND MOLDED ARTICLE INCLUDING THE SAME

CROSS-REFERENCE TO RELATED APPLICATIONS

The present application is a U.S. National Stage of PCT/KR2021/009254, filed on Jul. 19, 2021, which claims priority to Korean Patent Application No. 10-2020-0134309, filed on Oct. 16, 2020, and Korean Patent Application No. 10-2021-0093001, re-filed on Jul. 15, 2021, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article including the same. More particularly, the present invention relates to a thermoplastic resin composition having excellent transparency, colorability, color stability, chemical resistance, and antistatic properties, thus being suitable for use in the manufacture of medical products; a method of preparing the thermoplastic resin composition; and a molded article including the thermoplastic resin composition.

BACKGROUND ART

Recently, many changes are required in the material industry due to environmental problems. In particular, for medical materials or materials for food containers, problems such as environmental hormones or waste disposal are emerging. Accordingly, many efforts are being made to modify the existing polyvinyl chloride (hereinafter referred to as "PVC"), polycarbonate (hereinafter referred to as "PC"), and the like. In particular, in the field of transparent medical materials applied to syringes and tube connectors that store liquid substances therein, there is increasing demand for development of new materials.

Commonly used transparent resins include polycarbonate (PC) resins, polymethyl methacrylate (PMMA) resins, polystyrene (PS) resins, and polyacrylonitrile-styrene (SAN) resins.

Polycarbonate resins have excellent impact strength and transparency. However, due to poor processability, polycarbonate resins cannot be used in the manufacture of complex products. In addition, polycarbonate resins have poor chemical resistance. In addition, use of polycarbonate is limited due to toxicity of bisphenol-A used in the preparation of polycarbonate.

In addition, polymethyl methacrylate (PMMA) resins have excellent optical characteristics, but have poor impact resistance and chemical resistance. In addition, polystyrene resins and polyacrylonitrile-styrene resins have poor impact resistance and chemical resistance.

In addition, acrylonitrile-butadiene-styrene-based (hereinafter referred to as "ABS-based") terpolymers have excellent physical property balance between impact strength and fluidity, but are opaque.

U.S. Pat. No. 4,767,833, Japanese Application Pub. No. H11-147020, European Patent No. 703,252, and Japanese Application Pub. No. H8-199008 disclose methods of imparting transparency by introducing an acrylic acid alkyl ester compound or a methacrylic acid alkyl ester compound to an ABS-based resin having excellent impact resistance, chemical resistance, and processability. However, the above methods have a problem in that chemical resistance deteriorates under the influence of the methacrylic acid alkyl ester introduced to impart transparency. Accordingly, there is a limitation in applying the above methods to the manufacture of medical products.

To solve these problems, a polyether-amide block copolymer was introduced to a transparent ABS-based resin to ensure chemical resistance. However, transparency was degraded, and problems such as lack of blue color expression occurred.

Therefore, a thermoplastic resin composition satisfying all of transparency, colorability, and chemical resistance needs to be developed.

RELATED ART DOCUMENTS

Patent Documents

U.S. Pat. No. 4,767,833
Japanese Application Pub. No. hei 11-147020
European Patent No. 703,252
Japanese Application Pub. No. hei 8-199008

DISCLOSURE

Technical Problem

Therefore, the present invention has been made in view of the above problems, and it is one object of the present invention to provide a thermoplastic resin composition having excellent transparency, colorability, color stability, chemical resistance, and antistatic properties, thus being suitable for use in the manufacture of medical products; a method of preparing the thermoplastic resin composition; and a molded article including the thermoplastic resin composition.

The above and other objects can be accomplished by the present invention described below.

Technical Solution

In accordance with one aspect of the present invention, provided is a thermoplastic resin composition including 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer; 6 to 15 parts by weight of a polyether-amide block copolymer; 0.2 to 0.9 parts by weight of a metal stearate; and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, and the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound.

In addition, the present invention may provide a thermoplastic resin composition including 100 parts by weight of a base resin consisting of 30 to 50% by weight of a (meth)

acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer; 6 to 15 parts by weight of a polyether-amide block copolymer; 0.2 to 0.9 parts by weight of a metal stearate; and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound, and the thermoplastic resin composition has a transparency (haze value) of 4.0 or less as measured using a sheet having a thickness of 3 mm according to ASTM D1003.

In accordance with another aspect of the present invention, provided is a method of preparing a thermoplastic resin composition, the method including preparing pellets by kneading and extruding, under conditions of 200 to 300° C. and 100 to 300 rpm, 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer, 6 to 15 parts by weight of a polyether-amide block copolymer, 0.2 to 0.9 parts by weight of a metal stearate, and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, and the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound.

In addition, the present invention may provide a method of preparing a thermoplastic resin composition, the method including preparing pellets by kneading and extruding, under conditions of 200 to 300° C. and 100 to 300 rpm, 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer, 6 to 15 parts by weight of a polyether-amide block copolymer, 0.2 to 0.9 parts by weight of a metal stearate, and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound, and the prepared thermoplastic resin composition has a transparency (haze value) of 4.0 or less as measured using a sheet having a thickness of 3 mm according to ASTM D1003.

In accordance with yet another aspect of the present invention, provided is a molded article including the thermoplastic resin composition.

Advantageous Effects

The present invention has an effect of providing a thermoplastic resin composition having excellent transparency, colorability, color stability, chemical resistance, and antistatic properties, thus being suitable for use in the manufacture of high-quality medical products; a method of preparing the thermoplastic resin composition; and a molded article including the thermoplastic resin composition.

Best Mode

Hereinafter, a thermoplastic resin composition, a method of preparing the same, and a molded article including the same according to the present invention will be described in detail.

The present inventors confirmed that, when a thermoplastic resin composition was prepared by including a base resin including a (meth)acrylic acid alkyl ester compound-conjugated diene rubber-aromatic vinyl compound-vinyl cyanide compound graft copolymer and a (meth)acrylic acid alkyl ester compound-aromatic vinyl compound-vinyl cyanide compound non-graft copolymer; a polyether-amide block copolymer; a metal stearate; and an organic pigment in a predetermined content ratio, the thermoplastic resin composition having excellent chemical resistance, transparency, and color expression was obtained. Based on these results, the present inventors conducted further studies to complete the present invention.

The thermoplastic resin composition of the present invention includes 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer; 6 to 15 parts by weight of a polyether-amide block copolymer; 0.2 to 0.9 parts by weight of a metal stearate; and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, and the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound. In this case, the thermoplastic resin composition may have excellent transparency, colorability, color stability, chemical resistance, and antistatic properties, and thus, may be suitable for use in the manufacture of medical products.

Hereinafter, each component of the thermoplastic resin composition of the present invention will be described in detail.

Graft Copolymer

For example, the graft copolymer may be a graft copolymer including 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound.

The conjugated diene rubber is a polymer prepared by polymerizing a conjugated diene compound having a structure in which a double bond and a single bond are alternately arranged. For example, the conjugated diene rubber may be a butadiene polymer, a butadiene-styrene copolymer (SBR), a butadiene-acrylonitrile copolymer (NBR), an ethylene-propylene copolymer (EPDM), or a polymer derived therefrom, preferably a butadiene polymer, a butadiene-styrene copolymer, or a mixture thereof.

The conjugated diene rubber preferably has an average particle diameter of 200 to 400 nm, more preferably 250 to 350 nm. Within this range, mechanical properties such as impact strength may be excellent.

In this description, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

The graft copolymer is preferably a graft copolymer including 40 to 60% by weight of conjugated diene rubber, 25 to 40% by weight of a (meth)acrylic acid alkyl ester compound, 5 to 15% by weight of an aromatic vinyl compound, and 3 to 10% by weight of a vinyl cyanide compound, more preferably a graft copolymer including 45 to 55% by weight of conjugated diene rubber, 30 to 35% by weight of a (meth)acrylic acid alkyl ester compound, 7 to 15% by weight of an aromatic vinyl compound, and 5 to 10% by weight of a vinyl cyanide compound. Within this range, mechanical properties, such as impact strength, and chemical resistance may be excellent.

In this description, the content of a monomer in a polymer may mean a content (% by weight) of the monomer fed when the polymer is prepared, or may mean a value (% by weight) calculated by converting a unit in the polymer into the monomer.

The transparency of the graft copolymer is determined by the refractive index of rubber used and the refractive index of a polymer to be grafted, and the refractive index of the polymer is controlled by the mixing ratio of monomers. That is, since the refractive index of conjugated diene rubber latex and the refractive index of the remaining components must be matched to a similar degree, the mixing ratio of the monomers is very important. Accordingly, to implement transparency, the refractive index of conjugated diene rubber used as a core upon grafting should be similar to the refractive index of all components grafted to the core. It is most preferable that the refractive index of a conjugated diene compound matches the refractive index of all components to be grafted.

For example, a difference in refractive indexes between the conjugated diene rubber latex and the (meth)acrylic acid alkyl ester compound-aromatic vinyl compound-vinyl cyanide compound copolymer may be 0.01 or less, preferably less than 0.01. Within this range, due to excellent transparency and colorability, color stability may be excellent.

For example, the graft polymer may have a weight average molecular weight of 80,000 to 300,000 g/mol, preferably 100,000 to 200,000 g/mol, more preferably 130,000 to 170,000 g/mol. Within this range, impact strength, chemical resistance, and fluidity may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the graft copolymer may be prepared by emulsion polymerization. As a method of feeding each component, each component may be fed batchwise, or all or some of each component may be fed continuously (sequentially). However, the present invention is not limited thereto.

During graft polymerization, monomers and a molecular weight modifier may be fed at the same time to control molecular weight. For example, the molecular weight modifier may include dodecyl mercaptans such as tertiary dodecyl mercaptan and normal dodecyl mercaptan.

For example, in the present invention, the (meth)acrylic acid alkyl ester compound may be a methacrylic acid alkyl ester compound, an acrylic acid alkyl ester compound, or a mixture thereof, specifically may include one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, preferably methyl methacrylate.

In this description, "(meth)acrylic acid alkyl ester compound" refers to an acrylic acid alkyl ester compound and a methacrylic acid alkyl ester compound.

For example, in the present invention, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably styrene.

For example, in the present invention, the vinyl cyanide compound may include one or more selected from the group consisting of acrylonitrile, methacrylonitrile, ethylacrylonitrile, and isopropylacrylonitrile, preferably acrylonitrile.

The refractive indexes of the components used to prepare the graft copolymer of the present invention are as follows. Butadiene: 1.518, methyl methacrylate: 1.49, styrene: 1.59, acrylonitrile: 1.52, acrylic acid: 1.527, and polyethylene glycol monomethacrylate: 1.49 to 1.52.

In addition, the refractive index of the (meth)acrylic acid alkyl ester compound-aromatic vinyl compound-vinyl cyanide compound copolymer grafted onto the conjugated diene rubber of the graft copolymer may be calculated by Equation 1 below.

$$RI = \Sigma Wti * RIi \quad \text{[Equation 1]}$$

Wti=Weight fraction of each component in the copolymer (%)

RIi=Refractive index of the polymer of each component of the copolymer

Non-Graft Copolymer

For example, the non-graft copolymer may be a copolymer including 60 to 80% by weight of a (meth)acrylic acid alkyl ester compound, 15 to 35% by weight of an aromatic vinyl compound, and 1 to 15% by weight of a vinyl cyanide compound, preferably a copolymer including 65 to 75% by weight of a (meth)acrylic acid alkyl ester compound, 20 to 30% by weight of an aromatic vinyl compound, and 3 to 10% by weight of a vinyl cyanide compound. Within this range, mechanical properties, such as impact strength, and chemical resistance may be excellent.

For example, the non-graft copolymer may have a weight average molecular weight of 80,000 to 300,000 g/mol, preferably 100,000 to 200,000 g/mol, more preferably 110,000 to 150,000 g/mol. Within this range, impact strength, chemical resistance, and fluidity may be excellent.

For example, the non-graft copolymer may be prepared by suspension polymerization or bulk polymerization. In particular, continuous bulk polymerization is most preferable from the viewpoint of manufacturing cost.

For example, the refractive index of the non-graft copolymer is preferably similar to that of the graft copolymer. More preferably, a difference in refractive indexes between the non-graft copolymer and the graft copolymer is less than 0.01. In this case, due to excellent transparency, color stability may be excellent.

Base Resin

For example, the base resin includes 30 to 50% by weight of the graft copolymer and 50 to 70% by weight of the non-graft copolymer, preferably 35 to 45% by weight of the graft copolymer and 55 to 65% by weight of the non-graft copolymer. Within this range, mechanical strength, such as impact strength, fluidity, and chemical resistance may be excellent.

For example, in the base resin, a total content of conjugated diene rubber may be 10 to 30% by weight, a total content of a (meth)acrylic acid alkyl ester compound may be 50 to 60% by weight, a total content of an aromatic vinyl compound may be 15 to 25% by weight, and a total content of a vinyl cyanide compound may be 3 to 13% by weight. Preferably, a total content of conjugated diene rubber is 15 to 25% by weight, a total content of a (meth)acrylic acid alkyl ester compound is 52 to 57% by weight, a total content of an aromatic vinyl compound is 17 to 23% by weight, and a total content of a vinyl cyanide compound is 5 to 10% by weight. Within this range, all of transparency, colorability, chemical resistance, and antistatic properties may be excellent.

Polyether-Amide Block Copolymer

For example, based on 100 parts by weight of the base resin, the polyether-amide block copolymer may be included in an amount of 6 to 15 parts by weight, preferably 7 to 14 parts by weight, more preferably 8 to 13 parts by weight, still more preferably 10 to 13 parts by weight. Within this range, due to excellent transparency, color stability may be excellent. In addition, due to excellent antistatic properties and chemical resistance, the thermoplastic resin composition of the present invention may be suitable for use in the manufacture of medical products.

As another example, based on 100 parts by weight of the base resin, the polyether-amide block copolymer is preferably included in an amount of 6 to 15 parts by weight, more preferably 6 to 13 parts by weight, still more preferably 6 to 10 parts by weight, still more preferably 7 to 10 parts by weight. Within this range, due to excellent transparency, color stability may be excellent. In addition, due to excellent colorability and chemical resistance, the thermoplastic resin composition of the present invention may be suitable for use in the manufacture of medical products.

For example, the polyether-amide block copolymer may be composed of two components: a polyamide oligomer containing a carboxyl group at the terminal thereof and having a number average molecular weight of 100 to 6,000 g/mol and a bisphenol compound containing an oxyalkylene unit and having a number average molecular weight of 200 to 4,000 g/mol. Preferably, the polyether-amide block copolymer is composed of two components: a polyamide oligomer containing a carboxyl group at the terminal thereof and having a number average molecular weight of 200 to 5,000 g/mol and a bisphenol compound containing an oxyalkylene unit and having a number average molecular weight of 300 to 3,000 g/mol. More preferably, the polyether-amide block copolymer is composed of two components: a polyamide oligomer containing a carboxyl group at the terminal thereof and having a number average molecular weight of 1,000 to 4,000 g/mol and a bisphenol compound containing an oxyalkylene unit and having a number average molecular weight of 500 to 2,500 g/mol. In this case, transparency and antistatic properties may be excellent.

For example, the polyether-amide block copolymer may have a melting point of 100 to 260° C., preferably 186 to 204° C. Within this range, transparency and antistatic properties may be excellent.

In this description, the melting point of a polymer may be measured using a differential scanning calorimeter (DSC, model name: DSC 2920, manufacturer: TA instrument). Specifically, a polymer is heated to 220° C., maintained at this temperature for 5 minutes, cooled to 20° C., and then heated. At this time, temperature increase rate and temperature decrease rate are each set to 10° C./min.

Polyamide oligomers and bisphenol compounds commonly used in the art may be used as the polyamide oligomer and the bisphenol compound of the present invention, without particular limitation.

Metal Stearate

For example, based on 100 parts by weight of the base resin, the metal stearate may be included in an amount of 0.2 to 0.9 parts by weight, preferably 0.25 to 0.85 parts by weight, more preferably 0.3 to 0.8 parts by weight. Within this range, the thermoplastic resin composition of the present invention may have excellent transparency, color stability, and chemical resistance, and thus, may be suitable for use in the manufacture of medical products.

For example, the metal stearate may include one or more selected from the group consisting of calcium stearate, magnesium stearate, aluminum stearate, potassium stearate, and barium stearate, preferably magnesium stearate. In this case, transparency and antistatic properties may be improved.

When the metal stearate includes the polyether-amide block copolymer, due to the synergistic effect thereof, transmittance, transparency, chemical resistance, and antistatic properties may be improved.

Organic Pigment

For example, based on 100 parts by weight of the base resin, the organic pigment may be included in an amount of 0.001 to 0.006 parts by weight, preferably 0.001 to 0.005 parts by weight, more preferably 0.001 to 0.003 parts by weight. In this case, transparency, chemical resistance, and antistatic properties may be excellent. In addition, due to excellent blue color expression, the thermoplastic resin composition of the present invention may be suitable for use in the manufacture of medical products.

The organic pigment is preferably an anthraquinone-based dye. More preferably, the organic pigment includes one or more selected from the group consisting of 1-hydroxy-4-(p-toluidino)anthraquinone, 1,4-bis(mesitylamino)anthraquinone, 1,4-bis(methylamino)anthraquinone, and 1,4-bis[(2-ethyl-6-methylphenyl)amino]anthraquinone, still more preferably 1-hydroxy-4-(p-toluidino)anthraquinone. In this case, transparency, chemical resistance, and antistatic properties may be excellent. In addition, due to excellent blue color expression, the thermoplastic resin composition of the present invention may be suitable for use in the manufacture of medical products.

The anthraquinone-based dye has a blue color, and a conventional thermoplastic resin composition has insufficient color expression, especially blue expression. However, the base resin of the present invention has excellent color expression. Since blue has a calming effect and helps prevent mistakes caused by negative afterimage, blue is often used in medical supplies.

When the organic pigment includes a metal stearate, due to the synergistic effect thereof, transmittance and transparency may be further improved, and color expression may be improved.

Thermoplastic Resin Composition

The thermoplastic resin composition preferably has a transparency (haze value) of 4.0% or less, more preferably 3.8% or less, still more preferably 3.7% or less, still more preferably 3 to 3.7% as measured using a sheet having a thickness of 3 mm according to ASTM D1003. In this case, physical property balance, color expression, and color stability may be excellent.

The thermoplastic resin composition preferably has a transmittance of 63% or more, more preferably 64% or more, still more preferably 64 to 70% as measured using a sheet having a thickness of 3 mm according to ASTM D1003. In this case, physical property balance, color expression, and color stability may be excellent.

The thermoplastic resin composition preferably has an L value (whiteness) of 65 or more, more preferably 67 or more, still more preferably 67 to 77, still more preferably 68 to 75 as measured using a sheet having a thickness of 3 mm and using a Hunter Lab color meter according to ASTM D1003. Within this range, physical property balance, color expression, and color stability may be excellent.

The thermoplastic resin composition preferably has an "a" value of −2.1 to −3.1, more preferably −2.15 to −2.7, still more preferably −2.3 to −2.7 as measured using a sheet having a thickness of 3 mm and using a Hunter Lab color meter according to ASTM D1003. Within this range, blue color expression may be excellent.

The thermoplastic resin composition preferably has a "b" value of −16.5 to −20.15, more preferably −17 to −20, still more preferably −18 to −19, still more preferably −18.5 to −19 as measured using a sheet having a thickness of 3 mm and using a Hunter Lab color meter according to ASTM D1003. Within this range, blue color expression may be excellent.

The thermoplastic resin composition preferably has a surface resistance of $1.5 \times 10^{11}$ Ω/square or less, more preferably $7 \times 10^{10}$ Ω/square or less, still more preferably $5 \times 10^{10}$ Ω/square or less, still more preferably $1 \times 10^{10}$ to $4 \times 10^{10}$ Ω/square as measured using a resistivity device (8009, Keithley Co.). Within this range, physical property balance may be excellent, and generation of static electricity may be suppressed. In particular, malfunction may be prevented from occurring in a precision medical device.

When a tensile specimen is fixed to a 1.2% jig, a 70% isopropyl alcohol (IPA) solution is applied to the specimen, and the specimen is allowed to stand for 1 hour, the thermoplastic resin composition preferably exhibits no change. In this case, the thermoplastic resin composition may have excellent physical property balance and chemical resistance, and thus, may be applicable to medical products. Medical products are mainly used after sterilization with an IPA solution. When cracks or fractures occur in a specimen in a chemical resistance test with the IPA solution, the specimen may not be applied to medical products.

The thermoplastic resin composition preferably has a Notched Izod impact strength of 10 kgf·cm/cm or more, more preferably 11 kgf·cm/cm or more, still more preferably 11 to 15 kgf·cm/cm, still more preferably 12 to 15 kgf·cm/cm as measured using a ⅛-inch specimen according to ASTM D256. Within this range, physical property balance, transparency, and colorability may be excellent.

The thermoplastic resin composition preferably has a melt flow index of 28 g/10 min or more, more preferably 28 to 33 g/10 min, still more preferably 29 to 32 g/10 min as measured under conditions of 220° C. and 10 kg according to ASTM D1238. Within this range, physical property balance and moldability may be excellent.

For example, the thermoplastic resin composition may include one or more selected from the group consisting of a heat stabilizer, a UV stabilizer, a lubricant, and an antioxidant. In this case, required physical properties may be efficiently expressed without deteriorating the intrinsic physical properties of the thermoplastic resin composition of the present invention.

For example, the heat stabilizer may be a phenolic heat stabilizer, a phosphite-based heat stabilizer, or a mixture thereof. The phenolic heat stabilizer is preferably 2,6-di-tert-butyl-4-methylphenol, 2,2'-ethylene-bis(4-methyl-6-tert-butyl)-phenol, or a mixture thereof, and the phosphite-based heat stabilizer preferably includes one or more selected from the group consisting of phenyl phosphite, tris(2,4-t-butyl phenyl)phosphite, and tris-(nonylphenyl)phosphite. In this case, discoloration may be prevented.

For example, based on 100 parts by weight of the base resin, the heat stabilizer may be included in an amount of 0.1 to 3 parts by weight, preferably 0.5 to 1.5 parts by weight. In this case, discoloration may be prevented.

For example, the UV stabilizer may be a hindered amine light stabilizer (HALS)-based UV stabilizer, and preferably includes one or more selected from the group consisting of 1,1-bis(2,2,6,6-tetramethyl-4-piperidyl)succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzilmalonate, a condensation product of 1-(2-hydroxyethyl)-2,2,6,6-tetramethyl-4-hydroxypiperidine and succinic acid, a linear or cyclic condensation product of N,N'-bis(2,2,6,6-tetramethyl-4-piperidyl)hexamethylene diamine and 4-tert-octylamino-2,6-di-chloro-1,3,5-triazine, tris(2,2,6,6-tetramethyl-4-piperidyl)nitrilotriacetate, tetrakis (2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, a linear or cyclic condensation product of N,N'-bis(2,2,6,6-tetramethyl-4-piperidyl)hexamethylene diamine and 4-morpholino-2,6-dichloro-1,3,5-triazine, a reaction product of 7,7,9,9-tetramethyl-2-cycloundecyl-1-oxa-3,8-diaza-4-oxospiro-[4,5]decane and epichlorohydrin, and poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]. In this case, weather resistance may be greatly improved without reducing impact strength and fluidity.

More preferably, the hindered amine light stabilizer (HALS)-based UV stabilizer is bis(2,2,6,6-tetramethyl-4-piperidyl)sebacate, 2-(2H-benzotriazol-2-yl)-4-(1,1,3,3-tetramethylbutyl)phenol, poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino], or a mixture thereof, still more preferably includes one or more selected from the group consisting of bis(2,2,6,6-tetramethyl-4-piperidyl)sebacate and poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]. In this case, weather resistance may be greatly improved without reducing impact strength and fluidity.

For example, based on 100 parts by weight of the base resin, the UV stabilizer may be included in an amount of 0.1 to 3 parts by weight, preferably 0.5 to 1.5 parts by weight. In this case, weather resistance may be improved.

For example, the lubricant may be ethylene bis stearamide, polyethylene oxide wax, or a combination thereof. Based on 100 parts by weight of the base resin, the lubricant may be included in an amount of 0.1 to 3 parts by weight, preferably 0.1 to 1 part by weight.

In addition, the antioxidant may be a hindered phenolic antioxidant, and is preferably [3-[3-(4-hydroxy-3,5-ditert-butyl-phenyl)propanoyloxy]-2,2-bis[3-(4-hydroxy-3,5-di-tert-butyl-phenyl)propanoyloxymethyl]propyl]3-(4-hydroxy-3,5-ditert-butyl-phenyl)propanoate. In this case, weather resistance may be greatly improved without reducing impact strength and fluidity.

In addition, based on 100 parts by weight of the base resin, the antioxidant may be included in an amount of 0.1 to 2 parts by weight, preferably 0.3 to 1.5 parts by weight, more preferably 0.3 to 1 part by weight.

Method of Preparing Thermoplastic Resin Composition

A method of preparing a thermoplastic resin composition according to the present invention includes a step of preparing pellets by kneading and extruding, under conditions of 200 to 300° C. and 100 to 300 rpm, 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer, 6 to 15 parts by weight of a polyether-amide block copolymer, 0.2 to 0.9 parts by weight of a metal stearate, and 0.001 to 0.006 parts by weight of an organic pigment, wherein the graft copolymer is a graft copolymer including 30 to 70% by weight of conjugated diene rubber having an average particle diameter of 150 to 450 nm, 20 to 40% by weight of a (meth) acrylic acid alkyl ester compound, 5 to 20% by weight of an aromatic vinyl compound, and 1 to 15% by weight of a vinyl cyanide compound, and the non-graft copolymer is a copolymer including 60 to 80% by weight of a (meth)acrylic acid alkyl ester compound, 15 to 35% by weight of an aromatic vinyl compound, and 1 to 15% by weight of a vinyl cyanide compound. In this case, the thermoplastic resin composition of the present invention may have excellent transparency, colorability, color stability, chemical resistance, and antistatic properties and thus, may be suitable for use in the manufacture of medical products.

The method of preparing a thermoplastic resin composition shares all technical features of the above-described thermoplastic resin composition. Accordingly, repeated description thereof will be omitted.

The step of preparing pellets using an extrusion kneader is preferably performed at 200 to 300° C. in a size of 20 to 80 pi, more preferably at 210 to 260° C. in a size of 25 to 75 pi. Within this range, stable extrusion is possible, and kneading may be performed efficiently. At this time, the temperature is cylinder temperature, and pi means outer diameter (unit: mm).

The step of preparing pellets using an extrusion kneader is preferably performed at a screw rotation rate of 150 to 300 rpm, more preferably 200 to 300 rpm. Within this range, stable extrusion is possible, and kneading may be performed efficiently.

Extrusion kneaders commonly used in the art to which the present invention pertains may be used in the present invention without particular limitation, and a twin-screw extrusion kneader is preferably used.

Molded Article

A molded article of the present invention may include the thermoplastic resin composition. In this case, due to excellent transparency, color stability may be excellent. In addition, chemical resistance may be excellent.

For example, the molded article may be a medical product, as a specific example, a syringe, a tube connector, or the like.

A method of manufacturing the molded article includes a step of preparing pellets by kneading and extruding, under conditions of 200 to 300° C. and 100 to 300 rpm, 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer, 6 to 15 parts by weight of a polyether-amide block copolymer, 0.2 to 0.9 parts by weight of a metal stearate, and 0.001 to 0.006 parts by weight of an organic pigment; and a step of sheet-molding or injection-molding the prepared pellets at a molding temperature of 180 to 300° C. to manufacture a molded article. In this case, thermoplastic products having excellent processability may be manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.
- Polyether-amide block copolymer: Pelestat NC 6321 or Pelestat NC 6500 (refractive index 1.514) (SANYO Chemical Co.)
- Organic pigment: DIARESIN Blue G (CAS No. 81-48-1, Mitsubishi Chemical Co.)
- Metal stearate: Mg-st
- Antioxidant: ADK STAB PEP-8 (ADEKA Co.)

Preparation Example 1: Preparation of Graft Copolymer

Polybutadiene rubber latex having an average particle diameter of 300 nm and a refractive index of 1.516 was used as conjugated diene-based rubber latex. Reaction was performed by continuously adding 100 parts by weight of deionized water, 1.0 part by weight of sodium dodecylbenzenesulfonate as an emulsifier, 32 parts by weight of methyl methacrylate, 11 parts by weight of styrene, 7.0 parts by weight of acrylonitrile, 0.3 parts by weight of tert-dodecylmercaptan, 0.048 parts by weight of sodium formaldehyde sulfoxylate, 0.012 parts by weight of sodium ethylenediaminetetraester, 0.001 parts by weight of ferrous sulfate, and 0.04 parts by weight of cumene hydroperoxide to 50 parts by weight (based on solids) of the polybutadiene rubber latex at 75° C. for 5 hours. After reaction, temperature was raised to 80° C., aging was performed for 1 hour, and then reaction was terminated at a conversion rate of 99%. The resulting latex was aggregated with an aqueous calcium chloride solution and washed to obtain a powdered graft copolymer. At this time, the refractive index of the graft copolymer was 1.515. The refractive index of the graft copolymer was calculated by Equation 1.

Preparation Example 2: Preparation of Non-Graft Copolymer

A raw material mixture containing 69 parts by weight of methyl methacrylate, 24 parts by weight of styrene, 7 parts by weight of acrylonitrile, 30 parts by weight of toluene as a solvent, and 0.15 parts by weight of tert-dodecylmercaptan as a molecular weight modifier was continuously fed into a reaction tank so that average reaction time was 3 hours, and reaction temperature was maintained at 148° C. The polymer solution discharged from the reaction tank was heated in a preheating tank, unreacted monomers were volatilized in a volatilization tank, the temperature of the polymer was maintained at 210° C., and a copolymer in pellet form was obtained using a polymer transfer pump extrusion machine. The weight average molecular weight of the obtained copolymer was 120,000 g/mol, and the final refractive index of the obtained pellets was 1.516. The refractive index of the non-graft copolymer was calculated by Equation 1.

Example 1

12 parts by weight of a polyether-amide block copolymer, 0.3 parts by weight of Mg-st, 0.002 parts by weight of an organic pigment, and 0.2 parts by weight of an antioxidant were added to 100 parts by weight of a base resin including 40 parts by weight of the prepared graft copolymer and 60 parts by weight of the prepared non-graft copolymer, and pellets were prepared at a cylinder temperature of 230° C. using a twin-screw extrusion kneader. In addition, the prepared pellets were injected at a barrel temperature of 230° C. using an injection machine to prepare a specimen for measuring physical properties, and the injected specimen was aged under conditions of a temperature of 25° C. and a relative humidity of 50±5% for 12 hours. Then, physical properties were measured according to the following methods, and the results are shown in Table 1.

Examples 2 to 6 and Comparative Examples 1 to 9

The procedure was performed in the same manner as in Example 1, except that the components and the compositions shown in Tables 1 and 2 were used.

Test Examples

The properties of the specimens prepared in Examples 1 to 6 and Comparative Examples 1 to 9 were measured according to the following methods, and the results are shown in Tables 1 and 2 below.

Measurement Methods
- Refractive index: A part of the specimen was cut and compressed to obtain a film having a thickness of 0.2 mm, and the refractive index thereof was measured at 25° C. using an Abbe refractometer (Abbe-MARK-II).
- Transmittance (Tt, %) and transparency (haze, %): The transmittance and transparency of a sheet having a thickness of 3 mm were measured according to ASTM D1003.
- L value (whiteness), a value, b value: The L value (whiteness), a value, and b value of a sheet having a thickness of 3 mm were measured using a Hunter Lab color meter according to ASTM D1003.

For reference, the "L" value (whiteness) is a numerical value indicating the degree of white and black, the "a" value is a numerical value indicating the degree of red and green, and the "b" value is a numerical value indicating the degree of yellow and blue. As +L value increases, the degree of white increases. As −L value increases, the degree of black increases. As +a value increases, the degree of red increases. As −a value increases, the degree of green increases. As +b value increases, the degree of yellow increases. As −b value increases, the degree of blue increases.

- Chemical resistance: A tensile specimen was fixed to a 1.2% jig, and a 70% IPA solution was applied to the specimen. After 1 hour, change was observed.
- Surface resistance (Ω/square): Surface resistance was measured using a resistivity device (8009, Keithley Co.).
- Impact resistance (kgf·cm/cm): The Notched Izod impact strength of a ⅛-inch specimen was measured according to ASTM D256.
- Fluidity (MI, g/10 min): Fluidity was measured under conditions of 220° C. and 10 kg according to ASTM D1238.

TABLE 1

| Classification | Example 1 | Example 2 | Example 3 | Example 4 | Example 5 | Example 6 |
|---|---|---|---|---|---|---|
| Mg-st | 0.3 | 0.8 | 0.3 | 0.3 | 0.3 | 0.8 |
| Polyether-amide block copolymer | 12 | 12 | 8 | 14 | 12 | 12 |
| Organic pigment | 0.002 | 0.002 | 0.002 | 0.002 | 0.004 | 0.004 |
| Physical properties | | | | | | |
| Refractive index | 1.515 | 1.515 | 1.515 | 1.515 | 1.515 | 1.515 |
| Transmittance | 64.6 | 64.7 | 65.6 | 64.1 | 64.3 | 64.9 |
| Transparency | 3.7 | 3.6 | 3.5 | 3.8 | 3.9 | 3.7 |
| L value | 68.65 | 68.42 | 68.65 | 68.42 | 68.15 | 68.22 |
| a value | −2.69 | −2.65 | −2.49 | −2.85 | −2.23 | −2.15 |
| b value | −18.65 | −18.71 | −18.95 | −18.21 | −19.65 | −20.11 |
| Chemical resistance | No change | No change | No change | No change | No change | No change |
| Surface resistance | $6.6 \times 10^{10}$ | $3.6 \times 10^{10}$ | $1.3 \times 10^{11}$ | $1.1 \times 10^{10}$ | $6.2 \times 10^{10}$ | $3.3 \times 10^{10}$ |
| Impact strength | 12.0 | 11.2 | 12.2 | 10.5 | 12.0 | 11.1 |
| Melt flow index | 29.2 | 29.9 | 28.1 | 30.9 | 29.3 | 30.3 |

TABLE 2

| Classification | Comparative Examples | | | | | | | | |
|---|---|---|---|---|---|---|---|---|---|
| | 1 | 2 | 3 | 4 | 5 | 6 | 7 | 8 | 9 |
| Mg-st | 0 | 0.1 | 1.0 | 0.3 | 0.3 | 0.3 | 0.3 | 0.3 | 0.3 |
| Polyether-amide block polymer | 12 | 12 | 12 | 12 | 0 | 3 | 18 | 18 | 12 |
| Organic pigment | 0.002 | 0.002 | 0.002 | 0 | 0.002 | 0.002 | 0.002 | 0.004 | 0.01 |
| Physical properties | | | | | | | | | |
| Refractive index | 1.515 | 1.515 | 1.515 | 1.515 | 1.515 | 1.515 | 1.515 | 1.515 | 1.515 |
| Transmittance | 60.2 | 61.1 | 59.5 | 64.9 | 65.3 | 65.0 | 61.4 | 58.4 | 50.2 |
| Transparency | 6.1 | 5.5 | 10.7 | 3.5 | 3.4 | 3.5 | 4.8 | 6.7 | 8.3 |
| L value | 65.67 | 66.28 | 61.98 | 67.94 | 70.85 | 69.65 | 64.42 | 62.43 | 59.77 |
| a value | −1.68 | −2.06 | −2.84 | −0.91 | −2.32 | −2.40 | −1.45 | −1.65 | −1.97 |
| b value | −12.88 | −13.47 | −16.99 | 5.79 | −19.97 | −19.10 | −15.21 | −16.21 | −30.76 |
| Chemical resistance | No change | No change | No change | No change | Cut | Severe cracks | No change | No change | No change |
| Surface resistance | $2.4 \times 10^{13}$ | $1.1 \times 10^{12}$ | $1.6 \times 10^{10}$ | $5.6 \times 10^{10}$ | $4.0 \times 10^{16}$ | $3.3 \times 10^{12}$ | $8.2 \times 10^{9}$ | $6.5 \times 10^{9}$ | $5.6 \times 10^{10}$ |
| Impact strength | 12.1 | 12.1 | 10.1 | 11.9 | 12.9 | 12.2 | 9.9 | 9.5 | 11.0 |
| Melt flow index | 28.9 | 28.9 | 30.1 | 29.1 | 27.7 | 28.1 | 31.5 | 32.0 | 29.5 |

As shown in Tables 1 and 2, compared to Comparative Examples 1 to 9, in the case of Examples 1 to 6 according to the present invention, antistatic properties, transparency, and chemical resistance are excellent.

In addition, in the case of Examples 1 to 6 in which 0.002 to 0.004 parts by weight of the organic pigment is included, "a" value is within −2.15 to −2.69 and "b" value is within −18.21 to −20.11 as measured using a Hunter Lab color meter, indicating that blue is clearly expressed. In addition, color stability, antistatic properties, transparency, and chemical resistance are excellent.

Specifically, compared to Examples 1 to 6, in the case of Comparative Examples 1 and 5 in which the polyether-amide block copolymer or Mg-st is included alone, in addition to antistatic properties, transparency or chemical resistance is deteriorated. Thus, the products of Comparative Examples 1 and 5 may not be applied to medical products.

In addition, in the case of Comparative Examples 2 and 3 in which the content of Mg-st is out of the range of the present invention, transmittance, transparency, and L value are poor. In particular, in the case of Comparative Example 3 in which the content of Mg-st is less than the range of the present invention, antistatic properties are also degraded.

In addition, in the case of Comparative Examples 6 and 7 in which the content of the polyether-amide block copolymer is less than the range of the present invention, chemical resistance is very poor. In the case of Comparative Examples 7 and 8 in which the content of the polyether-amide block copolymer exceeds the range of the present invention, transmittance, transparency, and L value are poor, blue color expression is insufficient, and impact strength is reduced.

In addition, in the case of Comparative Example 9 in which the content of organic pigment exceeds the range of the present invention, "b" value is significantly reduced, so that blue color is excessively expressed. In addition, due to poor transmittance, transparency, and L value, transparency is poor.

In conclusion, it can be seen that the thermoplastic resin composition according to the present invention including a base resin consisting of a (meth)acrylic acid alkyl ester compound-conjugated diene rubber-aromatic vinyl compound-vinyl cyanide compound graft copolymer and a (meth)acrylic acid alkyl ester compound-aromatic vinyl compound-vinyl cyanide compound non-graft copolymer, a polyether-amide block copolymer, a metal stearate, and an organic pigment in a predetermined content ratio has excellent chemical resistance, transparency, and color expression.

The invention claimed is:

1. A thermoplastic resin composition, comprising:
100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer;
8 to 15 parts by weight of a polyether-amide block copolymer;
0.2 to 0.9 parts by weight of a metal stearate; and
0.001 to 0.006 parts by weight of an organic pigment,
wherein the graft copolymer is a graft copolymer comprising 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, and
the non-graft copolymer is a copolymer comprising 60 to 80% by weight of a (meth)acrylic acid alkyl ester compound, 15 to 35% by weight of an aromatic vinyl compound, and 1 to 15% by weight of a vinyl cyanide compound.

2. The thermoplastic resin composition according to claim 1, wherein the base resin comprises a total content of conjugated diene rubber of 10 to 30% by weight, a total content of a (meth)acrylic acid alkyl ester compound of 50 to 60% by weight, a total content of an aromatic vinyl compound of 15 to 25% by weight, and a total content of a vinyl cyanide compound of 3 to 13% by weight.

3. The thermoplastic resin composition according to claim 1, wherein a difference in refractive indexes between conjugated diene rubber and a (meth)acrylic acid alkyl ester compound-aromatic vinyl compound-vinyl cyanide compound copolymer in the graft copolymer is 0.01 or less.

4. The thermoplastic resin composition according to claim 1, wherein the (meth)acrylic acid alkyl ester compound comprises one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

5. The thermoplastic resin composition according to claim 1, wherein a difference in refractive indexes between the graft copolymer resin and the non-graft copolymer resin is less than 0.01.

6. The thermoplastic resin composition according to claim 1, wherein the polyether-amide block copolymer is comprised of two components: a polyamide oligomer containing a carboxyl group at a terminal thereof and having a number average molecular weight of 100 to 6,000 g/mol and a bisphenol compound containing an oxyalkylene unit and having a number average molecular weight of 200 to 4,000 g/mol.

7. The thermoplastic resin composition according to claim 1, wherein the metal stearate comprises one or more selected from the group consisting of calcium stearate, magnesium stearate, aluminum stearate, potassium stearate, and barium stearate.

8. The thermoplastic resin composition according to claim 1, wherein the organic dye comprises one or more selected from the group consisting of 1-hydroxy-4-(p-toluidino)anthraquinone, 1,4-bis(mesitylamino)anthraquinone, 1,4-bis(methylamino)anthraquinone, and 1,4-bis[(2-ethyl-6-methylphenyl)amino]anthraquinone.

9. The thermoplastic resin composition according to claim 1, wherein the thermoplastic resin composition further comprises one or more selected from the group consisting of a heat stabilizer, a UV stabilizer, a lubricant, and an antioxidant, wherein the lubricant includes bis stearamide, polyethylene oxide wax, or a combination thereof.

10. The thermoplastic resin composition according to claim 1, wherein the thermoplastic resin composition has a transparency (haze value) of 4.0 or less as measured using a sheet having a thickness of 3 mm according to ASTM D1003.

11. The thermoplastic resin composition according to claim 1, wherein the thermoplastic resin composition has an L value (whiteness) of 65 or more as measured using a sheet having a thickness of 3 mm and using a Hunter Lab color meter according to ASTM D1003.

12. The thermoplastic resin composition according to claim 1, wherein, when a tensile specimen comprising the thermoplastic resin composition is fixed to a 1.2% jig, a 70% isopropyl alcohol (IPA) solution is applied to the specimen, and the specimen is allowed to stand for 1 hour, the thermoplastic resin composition exhibits no change.

13. A molded article, comprising the thermoplastic resin composition according to claim 1.

14. A method of preparing a thermoplastic resin composition, comprising preparing pellets by kneading and extruding 100 parts by weight of a base resin consisting of 30 to 50% by weight of a (meth)acrylic acid alkyl ester compound-conjugated diene rubber-aromatic vinyl compound-vinyl cyanide compound graft copolymer and 50 to 70% by weight of a (meth)acrylic acid alkyl ester compound-aromatic vinyl compound-vinyl cyanide compound non-graft copolymer, 8 to 15 parts by weight of a polyether-amide block copolymer, 0.2 to 0.9 parts by weight of a metal stearate, and 0.001 to 0.006 parts by weight of an organic pigment under conditions of 200 to 300° C. and 100 to 300 rpm,
wherein the graft copolymer is a graft copolymer comprising 30 to 70% by weight of conjugated diene rubber having an average particle diameter of 150 to 450 nm, 20 to 40% by weight of a (meth)acrylic acid alkyl ester compound, 5 to 20% by weight of an aromatic vinyl compound, and 1 to 15% by weight of a vinyl cyanide compound, and
the non-graft copolymer is a copolymer comprising 60 to 80% by weight of a (meth)acrylic acid alkyl ester compound, 15 to 35% by weight of an aromatic vinyl compound, and 1 to 15% by weight of a vinyl cyanide compound.

* * * * *